United States Patent [19]

Coules et al.

[11] Patent Number: 5,682,662
[45] Date of Patent: Nov. 4, 1997

[54] TUBE CONNECTOR AND METHOD OF MAKING A CONNECTION

[75] Inventors: Russell G. Coules, Colleyville; Ganesh Rajagopal, Richardson; Jefferey W. Stewart, Bedford, all of Tex.

[73] Assignee: Abbott Laboratories, Abbott Park, Ill.

[21] Appl. No.: 602,193

[22] Filed: Feb. 16, 1996

Related U.S. Application Data

[62] Division of Ser. No. 291,001, Aug. 15, 1994, Pat. No. 5,536,049.

[51] Int. Cl.[6] .................................................. F16L 3/04
[52] U.S. Cl. ........................... 29/432; 29/432.2; 29/451; 29/525.04; 29/525.05; 29/525.15
[58] Field of Search .......................... 29/451, 432, 432.2, 29/525.02, 525.04, 525.05, 525.13, 525.15; 285/159, 322, 906

[56] References Cited

U.S. PATENT DOCUMENTS

| | | | |
|---|---|---|---|
| 2,547,394 | 4/1951 | Hynes et al. | 29/432 X |
| 4,150,466 | 4/1979 | Horvath | 29/432 X |
| 4,735,442 | 4/1988 | Bürli | 29/432 X |
| 5,171,045 | 12/1992 | Pasbirg | 285/906 X |

FOREIGN PATENT DOCUMENTS

| 285215 | 2/1928 | United Kingdom | 29/451 |
|---|---|---|---|

*Primary Examiner*—Joseph M. Gorski
*Attorney, Agent, or Firm*—Mark C. Bach

[57] ABSTRACT

One embodiment of the invention provides a joining element for joining a tube with a port. The joining element comprises a seal having a bore for accepting the tube, a nut and a ferrule. The ferrule has a bore for accepting the seal and the tube, a retaining member which retains the tube with the ferrule by engaging the tube, and a positive stop which limits engagement of the retaining member and the tube. The nut has a bore for accepting the ferrule and the tube and a bearing surface which engages the positive stop on the ferrule to positively limit engagement of the retaining member and the tube. Still other embodiments provide methods for forming a connection between a tube and a port. One such method comprises inserting the tube into a first member and a second member. The first member is moved with respect to the second member such that the second member is positioned partially within the first member. The first member, the second member and the tube are placed in the port. A mating structure on the first member is mated with a complementary mating structure on the port. The first member is moved with respect to the second member within the port such that a retention member on the second member engages the tube. The action of at least one of the first member and the retention member is positively limited.

4 Claims, 3 Drawing Sheets

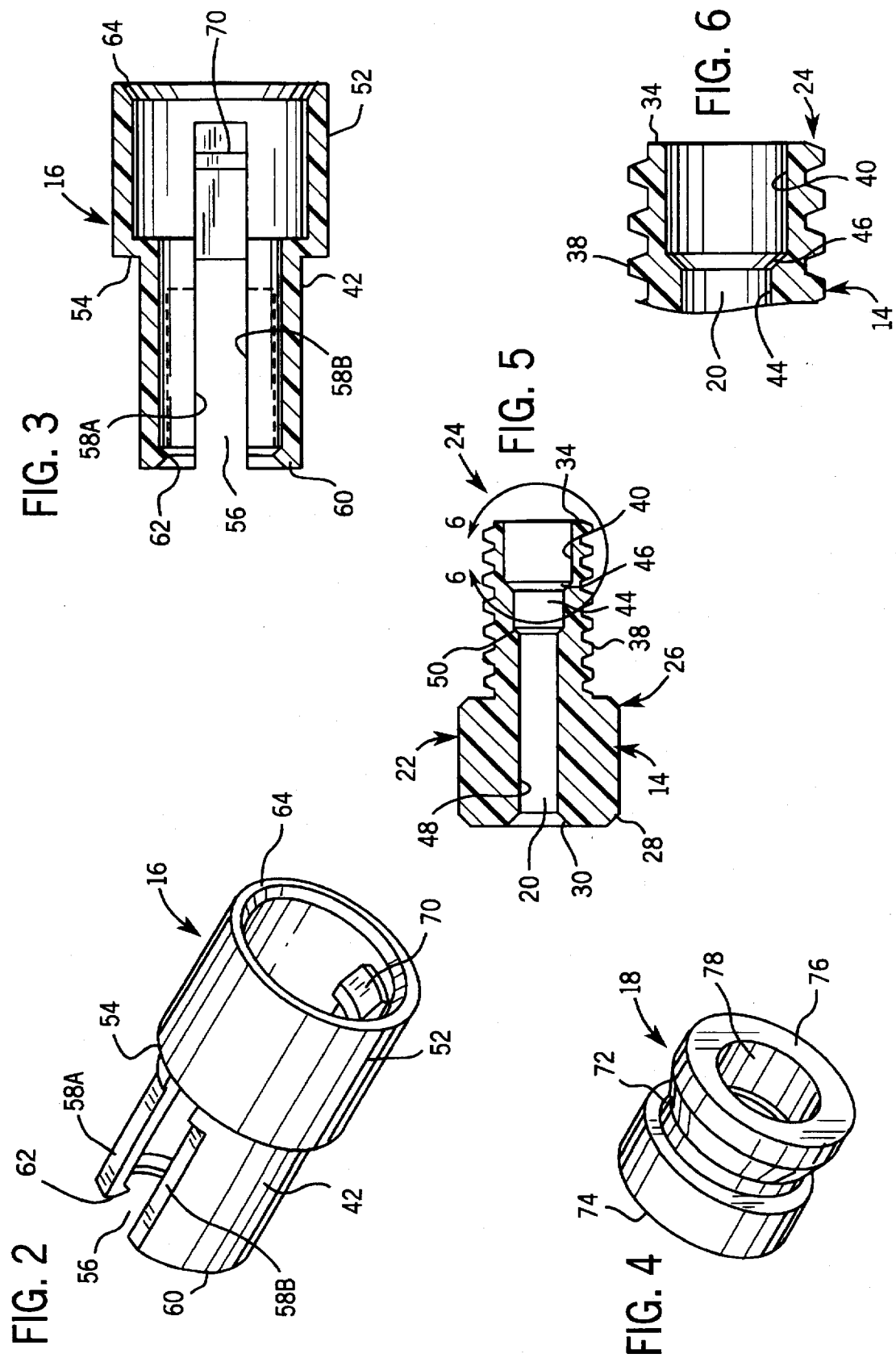

TUBE CONNECTOR AND METHOD OF MAKING A CONNECTION

This case is a division of U.S. patent application Ser. No. 08/291,001 filed Aug. 15, 1994 and now U.S. Pat. No. 5,536,049.

BACKGROUND OF THE INVENTION

Embodiments of the present invention generally relate to a joining element for use with a conduit and a method of making a connection with the joining element. More specifically, embodiments of the present invention relate to a connector for joining a tube on an analytical instrument and a method for making such a connection.

An analytical instrument may be a complex machine which performs a number of predetermined tasks. In order to perform these predetermined tasks, the analytical instrument may have structures dedicated to performing elements of those tasks. For instance, a biological sample analyzer may comprise a fluid system and a detection system. The fluid system may provide fluids, such as reagents and the like, to the sample. The sample/reagent mixture may be incubated. After incubation, the sample/reagent mixture may be read by the detection system thereby providing an operator with desired data.

In order for the analytical instrument to perform according to expectations, it is desirable that each element of the instrument function optimally. For example, it is desirable that every element of the detection system and the fluid system operate in an intended fashion. If an element of either the detection or fluid system were not to operate as expected, the entire instrument may not function according to specifications. This might result in inaccurate data being supplied to the instrument operator.

Focusing on the fluid system, it may comprise a series of conduits or tubes joined to ports in other structures in the instrument by a connector. Because the tubes may convey fluid, such as reagents and the like, from one part of the instrument, such as a stock bottle, to other parts of the instrument, such as a pump, a dispense head and the like, it is beneficial that no fluid leaks from any of the connections. Some reagents may be expensive, thereby further emphasizing the need to have no leaks.

The connections between the tubes and the other parts of the instrument may be made by connectors which compress the tubes or other structures in an effort to form a substantially fluid-tight connection. Also, the connection may be made by a threaded coupling of the connector and the port of the instrument.

Because of their constructions, some connectors may not perform according to expectations. Connectors that are produced in large quantities may exhibit variations from one connector to another. These variations may compromise the integrity of the connection made between the tube and the instrument, thereby possibly resulting in a fluid leak.

Connectors that utilize a threaded coupling may be sensitive to installation forces, such as a torque applied to the connector to engage threads. In some cases, an installer may apply too much torque, i.e. tighten the connector too much, in an effort to prevent a fluid leak. Over-tightening the connector may cause the tube to collapse to a certain extent. This can inhibit fluid flow through the instrument. On the other hand, if the connectors are not sufficiently tightened, they may leak. Because the connector may not provide the installer with an indication of a proper connection (appropriate tightness), the installer may not know if he has tightened the connector too little or too much.

In some cases, the connectors may loosen over time. In these cases, the connectors may have to be re-tightened periodically. But, an analytical instrument may be quite complex. The connectors may be difficult to reach and therefore difficult to re-tighten. Some connectors may require a tool for installation and re-tightening which may further complicate maintenance of the connection and the instrument.

During operation of an analytical instrument, various forces may be applied to a tube. These forces may try to pull the tube out of a connector. To reduce the probability that a tube will be pulled out of a connector, the connector may be provided with a blade-like member. This blade-like member is intended to cut into the tube just enough to resist the tube being pulled out of the connector. However, in some connectors, the distance of the cut into the tube is dependent upon how much the connector is tightened into the instrument. Therefore, if the installer over-tightens the connector, the blade-like member may cut too far into the tube, thereby possibly resulting in a leak. Alternatively, if the connector were insufficiently tightened, then the tube may pull away from the connector and the instrument port, also possibly causing a fluid leak.

Additionally, the construction of some connectors may not allow them to be reused. Removal of an connector from an instrument may damage the connector beyond repair. Also, the connector may damage the tube to such an extent that the tube as well as the connector must be replaced. Also, once the connector is disassembled, the individual parts comprising the connector may be lost.

SUMMARY OF THE INVENTION

One embodiment of the invention provides a joining element for joining a tube with a port. The joining element comprises a seal having a bore for accepting the tube, a nut and a ferrule. The ferrule has a bore for accepting the seal and the tube, a retaining member which retains the tube with the ferrule by engaging the tube, and a positive stop which limits engagement of the retaining member and the tube. The nut has a bore for accepting the ferrule and the tube and a bearing surface which engages the positive stop on the ferrule to positively limit engagement of the retaining member and the tube.

Another embodiment offers a connector for joining a tube with a port. The connector comprises a second member and a first member. The second member has a bore for accepting the tube, a retention member for retaining the tube with the second member, and an outer diameter surface defined by an outer diameter adjacent the retention member. The first member has a bore for accepting the second member and the tube, and a portion for activating the retention member on the second member to retain the tube with the second member, with the portion being defined by an inner diameter. The inner diameter and the outer diameter are predetermined to positively limit activation of the retention member.

Still other embodiments provide methods for forming a connection between a tube and a port. One such method comprises inserting the tube into a first member and a second member. The first member is moved with respect to the second member such that the second member is positioned partially within the first member. The first member, the second member and the tube are placed in the port. A mating structure on the first member is mated with a complementary mating structure on the port. The first member is moved with respect to the second member within the port such that a retention member on the second member engages the tube. The action of at least one of the first member and the retention member is positively limited.

BRIEF DESCRIPTION OF THE DRAWINGS

FIG. 2 is a perspective view of a ferrule comprising the tube connector;

FIG. 3 is a cross sectional view of the ferrule of FIG. 2;

FIG. 4 is a perspective view of a seal comprising the tube connector of FIG. 1;

FIG. 5 is a cross sectional view of a threaded member comprising the tube connector of FIG. 1;

FIG. 6 is an enlarged portion of FIG. 5; and

DETAILED DESCRIPTION OF PREFERRED EMBODIMENTS

Figure 1:
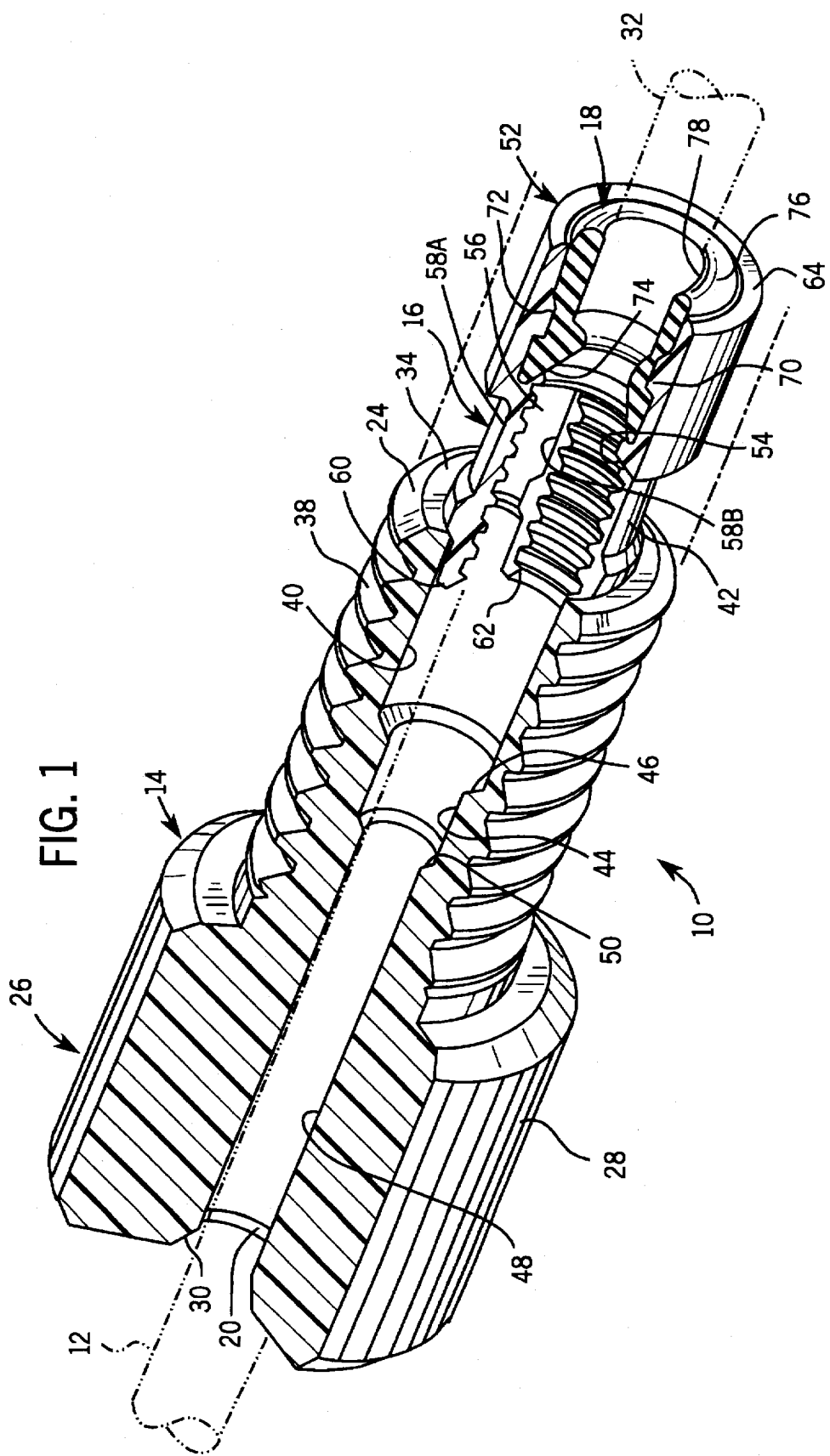
FIG. 1 is a cut-away expanded perspective view of a tube connector according to an embodiment of the present invention with a tube shown in dotted lines.
Figure 7:
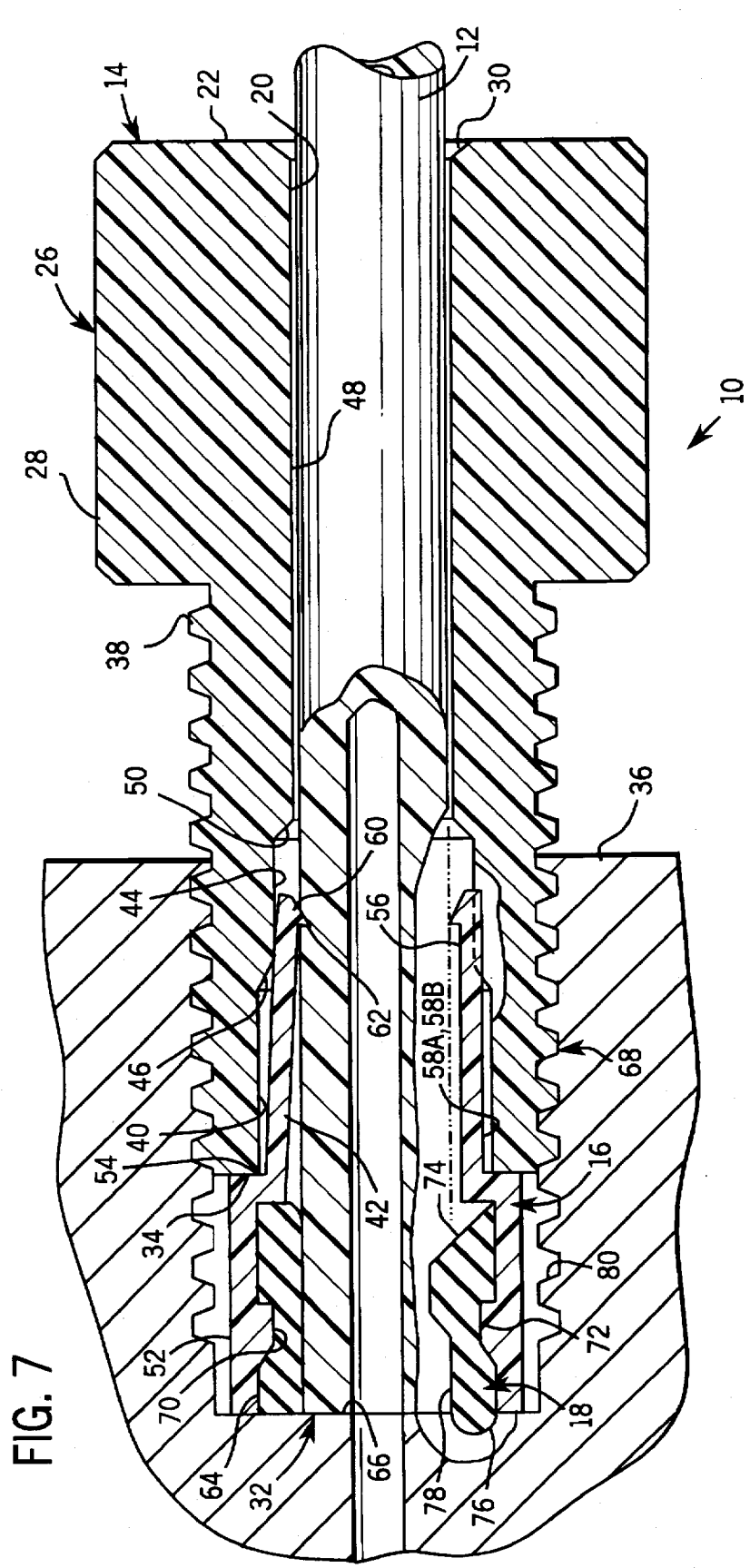
FIG. 7 is an enlarged cross sectional view of the tube connector disposed within a port.

FIGS. 1 and 7 illustrate joining elements or connectors 10 comprising embodiments of the present invention for joining a conduit or tube 12, shown in dotted lines, to another structure. In an exemplary embodiment, the connector 10 generally includes three elements: a first member or nut 14, a second member or ferrule 18 and a third member or seal 18. While the present invention will be described herein with respect to specific embodiments, for the sake of clarity of understanding, it is to be noted that other constructions are also possible. For instance, the seal 18 may be formed integrally with the ferrule 16. In suitable applications, the ferrule 16 may be provided integrally with the nut 14. Additionally, any suitable combination of elements of the described embodiments are also possible. Furthermore, while the illustrated embodiment of the connector 10 may be particularly useful for making a tube 12 connection in an analytical instrument, other applications of the connector 10 are also possible.

An exemplary construction of the nut 14 is shown in FIGS. 1 and 5 through 7. Specifically, the nut 14 is generally cylindrical in configuration having a through bore 20 for accepting the tube 12. The bore 20 defines an internal configuration of the nut 14 which facilitates gripping of the tube 12, as will be discussed in greater detail below. The bore 20 extends from a first end 22 of the nut 14 to a second end 24 of the nut 14.

In the illustrated embodiment, the first end 22 of the nut 14 is constructed to facilitate application of an installing force to the connector 10. In this embodiment, the first end 22 includes an outer diameter surface 26 bearing a gripping surface or knurl 28 to facilitate installation force transfer to the nut 14. Other configurations of the gripping surface are possible. For instance, if it were desirable to install the connector 10 with a tool, such as a wrench and the like, the gripping surface may be constructed with a configuration to facilitate force transfer from the wrench to the nut 14. However, in the illustrated embodiment, the connector 10 is intended to be installed by hand. Thus, the knurl 28 is configured to generate friction between the installer's hand and the nut 14. To ease introduction of the tube 12 into the bore 20, the first end 22 includes a beveled surface 30. The surface 30 is inclined inwardly toward an axis of elongation of the bore 20. In this manner, when the end 32 of the tube 12 engages the beveled surface 30, the end 32, and therefore the tube 12, will be directed into the bore 20.

The second end 24 of the nut 14 includes a bearing surface 34. The bearing surface 34 cooperates with structures on the ferrule 16 to form a mechanism for positively limiting constriction of the inner diameter of the tube 12 when the tube 12 is joined by the connector 10. A portion of the outer surface of the nut 14 from a distal end of the knurl 28 to a proximal end of the bearing surface 34 includes structures for mating with a portion of a body 36 (FIG. 7) to which the tube 12 is to be joined. In the illustrated embodiment, these mating structures comprise threads 38. Other mating structures, such as those generating an interference fit and the like, are also possible.

Adjacent the second end 24, the bore 20 deviates from a substantially smooth cylindrical configuration. Specifically, an enlarged diameter portion 40 is located immediately adjacent the second end 24. The length of the inner diameter of the nut 14 at this portion 40 is substantially similar to the length of an outer diameter of an entering portion 42 of the ferrule 16 so that the entering portion 42 of the ferrule 16 fits diametrically within the enlarged portion 40. The enlarged portion 40 extends a limited distance axially along the nut 14.

A relatively reduced diameter portion 44 is located on the nut 14 proximally of the portion 40. The inner diameter of the portion 44 is smaller than the outer diameter of the entering portion 42 of the ferrule 16. The portion 44 cooperates with the ferrule 16 for retaining the tube 12 against axial movement (pull out) with respect to the connector 10 as will be discussed in greater detail later. A beveled portion 46 connects the enlarged portion 40 to the reduced portion 44. The beveled portion 46 slopes from the portion 40 to the portion 44 so that the entering portion 42 of the ferrule 16 moves from the portion 40 to the portion 44 upon relative axial movement between the nut 14 and the ferrule 16 when the connector 10 is installed. The portion 44 also extends a limited distance axially along the nut 14. The portion 44 is joined to a tube engaging portion 48 of the bore 20 by another beveled portion 50. The portion 48 has a diameter substantially equal to an outer diameter of the tube 12.

An exemplary embodiment of the ferrule 16 is shown in FIGS. 1 through 3 and 7. The ferrule 16 generally comprises a relatively large outer diameter portion 52 and the entering portion 42. The portion 42 of the ferrule 16 is substantially hollowly cylindrical interrupted circumferentially by at least one axially extending slot 56. In the illustrated embodiment, there are two such slots 56 spaced equidistantly circumferentially on the portion 42. The slot 56 extends along almost the entire axial length of the portion 42. The slot 56 cooperates with the portion 44 on the nut 14 and forms part of a mechanism for resisting pull out of the tube 12.

The slot 56 is bounded circumferentially or longitudinally on the portion 42 by a pair of reduced sections 58A and 58B on the portion 42. There is one set of reduced sections 58A and 58B for each slot 56 on the portion 42. The reduced sections 58A and 58B may have an outer diameter smaller than the outer diameter of the remainder of the portion 42 or may be substantially planar extending beneath a projection of the outer surface of the remainder of the portion 42. The sections 58A and 58B reduce contact between the ferrule 16 and the nut 14 such that rotational movement of the ferrule 16, upon rotational movement of the nut 14 in the illustrated embodiment, is limited. In this manner, during installation of the connector 10, the tube 12 should not rotate more than about 90 degrees within the ferrule 16. Additionally, the materials of the nut 14 and the ferrule 16 are preferably chosen so as to minimize a coefficient of friction between the nut 14 and the ferrule 16. In these ways, the ferrule 16, and thus the tube 12, is intended to remain substantially rotationally stationary with respect to the nut 14 during installation and/or removal or the connector 10. By doing this, the possibility of leaks at the connector 10 can be reduced. Also, by remaining relatively rotationally stationary, buckling, twisting, etc. of the tube 12 is reduced during installation of the connector 10. This allows control of tube 12 routing because the tube 12 will tend to remain within a predetermined area in a predetermined configuration.

The portion 42 has a distal end, adjacent to a positive stop or proximal end 54 of the portion 52, and a proximal end 60. The proximal end 60 of the portion 42 is insertable into the bore 20 in the nut 14 to facilitate joinder of the ferrule 16 and the nut 14. At least one tube retention member or element or barb 62 is disposed on an inner diameter surface of the portion 42 adjacent the proximal end 60. In the illustrated embodiment, the barb 62 is interrupted by the slots 56 on the portion 42. Thus, two barbs 62 (FIG. 7) are formed diametrically offset on the inner surface of the portion 42 adjacent the proximal end 60. In other embodiments, multiple barbs 62 may be located axially offset along the inner surface of the ferrule 16. In still other embodiments, the barbs 62 may comprise no-lead threads located on the same surface of the ferrule 16. If a plurality of barbs 62 were utilized, as in FIG. 1, then it is possible to retain the tube 12 with a relatively reduced diametrical bite into the tube 12 and a correspondingly reduced reduction of the tube 12 inner diameter. In any case, the barb 62 is intended to "bite" to a positively limited extent into an outer surface of the tube 12. The interaction between the barb 62 and the tube 12 reduces the likelihood that the tube 12 may be pulled axially out of the connector 10 when installed. Preferably, the barb 62 and the tube 12 interact sufficiently such that a force of more than about 5 pounds is required to remove the tube 12 axially from the installed connector 10. The barb 62 is constructed such that the retention force it applies to the tube 12 is not substantially affected by material creep over time. Also, the barb 62 is supported by the entering portion 42 of the ferrule 16. The construction of the barb 62 and the entering portion 42 reduce a normal force at a zone of contact between the ferrule 16 and the tube 12 by spacing the contact zone from the portion 40 of the ferrule 16.

The proximal end 54 of the portion 52 joins the portion 52 to the portion 42. The proximal end 54 of the portion 52 also cooperates with the bearing surface 34 on the second or entering end 24 of the nut 14 to positively limit the extent of biting of the barb 62 into the tube 12. By positively limiting this extent, constriction of the inner diameter of the tube 12 is also limited positively. Specifically, contact between the outer diameter surface of the entering portion 42 of the ferrule 16 and the inner diameter surface of the reduced portion 44 of the nut 14 forces the barb 62 into the outer diameter surface of the tube 12. However, because the inner diameter of the reduced portion 44 is constant, the contact between the reduced portion 44 and the entering portion 42 is limited. The extent of biting of the barb 62 into the outer surface of the tube 12 can be predetermined by appropriately choosing relevant diameters of the portion 44 of the nut 14 and the portion 42 of the ferrule 16.

Contact between the bearing surface 34 and the proximal end 54 limits axial movement of the ferrule 16 with respect to the nut 14. These elements combine to positively limit the extent to which the barb 62 may bite into the outer surface of the tube 12. Because this biting is positively limited, constriction of the inner diameter of the tube 12 is also positively limited. In some embodiments, the barb 62 does not constrict an inner diameter of the tube 12 by more than about five per cent. Contact between the bearing surface 34 and the proximal end 54 of the portion 52 of the ferrule 16 also provides the installer with feedback indicative of completed installation of the connector 10 within a port 68 in a body 36. The contact between the bearing surface 34 and the proximal end 54 also limits axial movement of the nut 14 relative to the ferrule 16. Preferably, the contact is achieved upon rotation of the nut 14 with respect to the ferrule 16 by about one and one-quarter turns. This can reduce the possibility of over-tightening of the connector 10, thereby further reducing the probability of a leak.

The portion 52 of the ferrule 16 also has a distal end 64. The distal end 64 is intended to engage a base 66 of a port 68 in the body 36, as shown in FIG. 7. At least one barb 70 is located on an inner diameter surface of the portion 52 adjacent the distal end 64. In the illustrated embodiment, two barbs 70 are located offset diametrically on the portion 52. The barb 70 is constructed to retain the seal 18 (FIG. 4) with the ferrule 16. Specifically, the barb 70 has a configuration which complements the configuration of a groove 72 on the seal 18. The groove 72 is annular in the illustrated embodiment, but may be discontinuous in other embodiments. Cooperation of the barb 70 on the ferrule 16 and the groove 72 in the seal 18 forms a snap fit.

The seal 18 itself has a proximal end 74 and a distal end 76. The proximal end 74 engages a stepped interior surface of the ferrule adjacent the junction of the portion 42 and the portion 52. The seal 18 is substantially cylindrical and has an axial bore 78 for accepting the tube 12. Accordingly, the diameter of the bore 78 is chosen such that the seal 18 fluid-tightly engages the outer surface of the tube 12 without causing substantial constriction of the inner diameter of the tube 12. In some embodiments, the hardness of the material comprising the seal 18 and the area of contact between the seal 18 and the tube 12 is predetermined such that the inner diameter of the tube 12 is not constricted by more than about 5 per cent.

The seal 18 has an axial length predetermined such that the distal end 76 of the seal 18, in a "rest" condition shown at the bottom, as viewed, of FIG. 7, extends beyond the distal end 64 of the portion 52 of the ferrule 16. The distal end 64 of the seal 18 engages the base 66 of the port 68 upon installation of the connector 10. As the connector 10 is installed, the seal 18 is deformed, as shown at the top, as viewed, of FIG. 7, to reduce the possibility of a leaky connection.

The following discussion further defines a preferred embodiment of the connector 10. It is to be remembered that these materials and dimensions are provided for clarity of understanding and are illustrative only. Other materials and dimensions are also possible. For instance, metal tubing can be accommodated by appropriately choosing materials for the nut 14 and the ferrule 16. Also, the compatibility of the connector 10 is substantially independent of the inner diameter of the tube 12. However, the connector 10 is dependent on the tube 12 outer diameter.

One embodiment of the connector 10 is intended to mate with a ¼ 28 UNF planar bottom port and a tube 12 having an outer diameter of about 0.10 inches and an inner diameter of about 0.04 inches. However, other ports and tube dimensions are possible. The tube 12 may be made of a suitable polymer, such as PTFE, HDPE and the like. The nut 14 is formed from a suitable polymer, such as an acetal and the like. The nut 14 may be formed by injection molding, machining and the like. The nut 14 is about 0.7 inches long. The knurled portion is about 0.3 inches long and the threaded portion is about 0.4 inches long. The beveled surface 30 on the first end 22 on the nut 14 defines an angle of about 45 degrees with respect to the axis of elongation of the nut 14. The inner diameter of the tube engaging portion 48 is about 0.104 inches. The inner diameter of the reduced portion 44 is about 0.13 inches and of the enlarged portion 40 is about 0.16 inches. The portion 44 has an axial length of about 0.1 inches and the portion 40 has an axial length of about 0.15 inches. The angles defined by the beveled surfaces 46 and 50 measure about 30 degrees with respect to an axis of elongation of the nut 14.

The ferrule 16 is made of a suitable polymer, such as nylon, preferably glass filled (about 15 to 33%) nylon. It is remembered that the materials forming the nut 14 and the ferrule 16 are chosen such that a coefficient of friction between them is minimized. The ferrule 16 is about 0.35 inches long. The outer diameter of the portion 52 is about 0.2 inches, while its inner diameter is about 0.16 inches and its length is about 0.14 inches. The barb 70 is about 0.04 inches in axial length and two barbs 70 diametrically offset define a diameter between them of about 0.13 inches. The entering portion 42 defines an inner diameter of about 0.11 inches and the slot 56 is about 0.05 inches wide. The barbs 62 which grip the tube 12 define a diameter between them of about 0.1 inches in a rest condition. The barbs 62 are about 0.018 inches in axial length.

The seal 18 is made of a suitable elastomer, such as a fluorocarbon rubber and the like. Elastomers are preferable because they can accommodate larger dimensional variances among the tube 12, the seal 18, ferrule 16 and port 68. Also, elastomers can accommodate configuration changes due to movement of materials comprising the connector 10, the tube 12 and/or the body 36 over time. In some embodiments, the seal 18, as well as the tube 12, may be in contact with fluid. Therefore, the material comprising the seal 18 should be compatible with the fluid conveyed in the tube 12. In one exemplary embodiment, VITON™ (Du Pont) can satisfy these requirements. The seal, in an undeformed state, defines an inner diameter of about 0.08 inches and an outer diameter of about 0.14 inches.

With the structure of the connector 10 being thusly described, a method of making a connection or installation of the connector 10 will now be discussed in detail. Further structural specifications may be explained with reference to the following discussion. Also, it is to be remembered that removal of the connector 10 may be effected by reversing the order of the below described steps.

To begin installation, the installer prepares the tube 12. A substantially planar surface is made at the end 32 of the tube 12. Then, the members comprising the connector 10 are threaded onto the tube 12. First, the nut 14 is slid over the end 32 of the tube 12 such that the tube 12 enters and passes through the bore 20. Then, the ferrule 16 is slid over the end 32 of the tube 12. Finally, the seal 18 is applied to the end 32 of the tube 12. In an exemplary construction, the end 32 of the tube 12 is substantially flush with the distal end 76 of the seal 18. In this manner, after installation, a substantially smooth transition will be formed between the tube 12 and the body 36. This smooth transition can reduce the probability of pressure loss, air entrapment, etc. at the tube 12/body 36 interface. If the end 32 of the tube 12 were to extend beyond the distal end 76 of the seal 18, then forces generated during installation between the end 32 of the tube 12 and the base 66 of the port 68 in the body 36 can cause the tube 12 to shift axially with respect to the seal 18 such that the above-described alignment of end 32 and end 76 is achieved.

Because of diametric interference between the outer surface of the tube 12 and the inner surface of the seal 18, the seal 18 remains in place on the end 32 of the tube 12. The installer moves the ferrule 16 towards the seal 18 and the end 32 of the tube 12 such that the barb 70 on the distal end 64 of the portion 52 of the ferrule moves into the groove 72 on the seal 18. At this point the seal 18 and the ferrule 16 are operatively coupled. In other embodiments the ferrule 16 and the seal 18 may be integral, formed from the same materials or from different materials.

The installer then moves the nut 14 towards the ferrule 16 and the seal 18 by gripping the knurl 28 and applying appropriate force. The entering portion 42 of the ferrule 16 moves into the portion 40 of the nut 14. Then, the installer moves the connector 10 and the tube 12 into the port 68 in the body 36.

As the connector 10 enters the port 68, the mating structures or threads 38 on the outer diameter surface of the nut 14 matingly engage complementary mating structures or threads 80 on the port 68. The installer applies appropriate force or torque to the nut 14 such that the nut 14 advances axially towards the base 66 of the port 68 under the influence of the threaded engagement between threads 38 and threads 80.

As the nut 14 moves axially towards the base 66, the proximal end 60 of the portion 42 of the ferrule 16 moves adjacent the portion 40 of the nut 14. Upon sufficient axial movement of the nut 14 and when the distal end 64 of the ferrule 16 engages the base 66 of the port 68, as discussed below, the proximal end 60 of the portion 42 of the ferrule 16 engages the beveled portion 50 on the nut 14. The inclination of the portion 50 directs the proximal end 60 and the entering portion 42 of the ferrule 16 into the reduced portion 44 of the nut 14.

As the nut 14 moves axially towards the base 66 of the port 68, the distal end 76 of the seal 18 contacts the base 66. Because of this contact, the seal 18 changes from an undeformed condition, shown at the bottom, as viewed, of FIG. 7, to a deformed sealing condition, shown at the top, as viewed, of FIG. 7. The seal 18 deforms to fluid-tightly seal the interface between the end 32 of the tube 12 and the base 66 of the port 68. The seal 18 approaches its fully deformed condition as the distal end 64 of the portion 52 of the ferrule 16 contacts the base 66. Contact between the distal end 64 and the base 66 assists in positively limiting deformation of the seal 18 to a substantially annular region between the outer diameter surface of the tube 12 and the inner diameter surface of the portion 52 of the ferrule 16.

The distal end 64 of the ferrule 16 engages the base 66 of the port 68. The ferrule 16 does not move further axially towards the base 66. Rotation of the nut 14 after the distal end 64 engages the base causes the entering portion 42 of the ferrule 16 to move further into the portion 44 of the nut 14. Engagement of the entering portion 42 with the reduced portion 44 causes the entering portion 42 to flex radially inwardly. The slot 56 allows for this flexing by permitting the distance between the sections 58A and 58B to be reduced. The sections 58A and 58B reduce contact between the nut 14 and the ferrule 16 which might cause the ferrule 16 to rotate conjointly with the nut 14. Thus, the tube 12 and the ferrule 16 remain substantially rotationally stationary within the port 68 as the nut 14 threadibly rotates within the port 68.

As the entering portion 42 flexes, the barb 62 bites into the outer diameter surface of the tube 12. The distance through which the barb 62 bites into the tube 12 is predetermined by the preselected differences between the outer diameter of the entering portion 42 of the ferrule 16 and the inner diameter of the portion 44 of the nut 14. Furthermore, upon sufficient axial movement of the nut 14 with respect to the ferrule 16 within the port 68, the proximal end 54 of the portion 52 of the ferrule 16 contacts the bearing surface 34 on the second end 24 of the nut 14. This contact provides the installer with feedback indicative of a sufficiently tight connection being made by the connector 10. Contact between the end 54 and the surface 34 also positively limits the extent of biting of the barb 62 into the outer diameter surface of the tube 12. Specifically, the contact between the end 54 and the surface 34 positively limits the entering portion 42 of the ferrule 16 from axially advancing towards portions of the nut 14 having an inner diameter smaller than the inner diameter of the portion 44 of the nut 14. By providing these positive limits, the fluid-tight seal provided by the connector 10 is independent of the torque or installing force applied. Thus, the connector 10 will not be overtightened and the tube 12 will not be excessively constricted.

Once the connector 10 has been installed in this fashion, it is possible to remove or disassemble the connector 10 from the port 68 in the body 36 by reversing the above-discussed method steps. Because the connector 10 is installed without a tool and is not overtightened, viz. it is made only "finger-tight" (about 5 to about 50 oz.in.) within the bore 68, it can be removed without the need of tools. Also, because the seal 18 grips the end 32 of the tube 12, the ferrule 16 and the nut 14 should not become disassociated from the tube 12 upon removal of the connector 10 from the port 68. This reduces the probability of loose parts that may be lost. Preferably, the connector 10 has sufficient structural integrity to withstand about 50 cycles of installation and removal without replacement.

By connecting the tube 12 to the port 68 in the body 36 in this fashion, a number of benefits can be realized. A smooth transition may be provided from the tube 12 to the body 36, thereby reducing possible pressure or fluid loss, as well as air entrapment, at the connection. The nut 14 preferably is rotated by no more than one and one-quarter revolutions during installation. No leaks should be present at the connection, and the connector 10 and the tube 12 within the connector 10 should be able to withstand internal pressures of about +45 psig to about −10 psig. Given the materials discussed above, the connector 10 should be able to withstand temperatures substantially within the range of about 2 to about 45 degrees Celsius.

Because of the construction of the nut 14 and the ferrule 16, the connector 10 should be able to withstand a force of about 5 pounds intended to pull the tube 12 out of the connector 10 when installed. The tube 12 should not rotate more than about 90 degrees as the nut 14 is rotated within the port 68. Flexing of the tube 12 proximally of the connector 10 should not cause any leaks at the connector 10.

While the embodiment of the invention shown in the Figures illustrates one connector 10 and one single tube 12, it is to be noted that the embodiments of the invention do not have to be so limited. For instance, it is possible to have multiple connectors 10 operatively associated with each other by a carrier or manifold. The connectors 10 may be attached to or formed integrally with the carrier. Instead of threads, an outer diameter surface of the associated nuts 14 may include other mating structures, such as structures sufficient for generating an interference fit between the nuts 14 and the ports 68. The connectors 10 are press fitted into the ports 68, mimicking the above-described installation steps. The carrier may be maintained in place by a suitable bracket, clamp and the like. Thus, multiple connectors 10 may be simultaneously installed into multiple ports 68 by manipulation of the carrier. In still other embodiments, all parts comprising the connector 10 may be molded integrally, possibly with a retention mechanism, such as a screw detent and the like. Furthermore, the first end 22 of the nut 14 may be provided with an application force or torque limiting mechanism, such as a clutch assembly and the like.

What is claimed is:

1. A method for forming a connection between a tube and a port, the method comprising the steps of:
   (a) providing a tube having first and second ends;
   (b) providing a first member having first and second ends, an outer circumferential surface having mating structure thereon, and a bore extending therethrough, said bore being defined by:
      (i) a first diameter portion located between said first and second ends;
      (ii) a second diameter portion located between said first diameter portion and said second end;
      (iii) a vertical wall joining said first diameter portion to said second diameter portion;
      (iv) a third diameter portion between said second diameter portion and said second end; and
      (v) an inclined portion joining said second diameter portion to said third diameter portion, wherein the diameter of said first diameter portion is greater than that of said second diameter portion and the diameter of said second diameter portion is greater than that of
   (c) providing a second member having first and second ends and a bore extending therethrough, with a retention member extending inwardly from said bore at said second end, and also having an outer surface defined by first and second diameter portions with a vertical wall joining these portions to one another; wherein said second diameter portion has a diameter greater than that of said third diameter portion of said first member, and less than that of said second diameter portion of said first member;
   (d) providing a seal having first and second ends and a bore extending therethrough;
   (e) providing a port having a bore defined by mating structure, and an end wall extending perpendicularly to said bore;
   (f) locating said seal partially within said bore of said second member at said first end thereof;
   (g) locating said second member partially within said first member at said first end thereof;
   (h) locating said tube at least partially within said first member, said member and said seal, such that said first end of said seal extends from said first end of said second member, and said first end of said second member extends from said first end of said first member;
   (i) inserting said tube, said seal, said second member and said first end of said first member into said bore of said port, such that said mating structure of said first member engages said mating structure of said port;
   (j) moving said first member further into said bore of said portion by continually engaging said mating structure of said first member with said mating structure of said port, thereby causing:
      (i) said inclined portion and said third diameter portion to deflect said second diameter portion of said second member inwardly such that said retention member engages said tube; and (ii) said vertical wall of said first member to abut said vertical wall of said second member, such that said first member drives said second member, said seal and said tube against said end wall, whereby said seal deforms against said end wall and forms a leak-proof joint between said tube and said port.

2. The method as defined in claim 1, wherein the step of abutting said vertical wall of said first member with said vertical wall of said second member positively limits the engagement of said retention member with said tube.

3. The method as defined in claim 1, wherein the step of abutting said vertical wall of said first member with said vertical wall of said second member provides feedback indicative of completion of the connection.

4. The method as defined in claim 1, wherein the step of deforming said seal against said end wall and the step of engaging said retention member with said tube, each constricts an inner diameter of said tube by no more than about five per cent.

* * * * *